United States Patent
Cho

(10) Patent No.: US 11,285,799 B1
(45) Date of Patent: Mar. 29, 2022

(54) POWER TRANSMISSION APPARATUS OF HYBRID VEHICLE

(71) Applicants: Hyundai Motor Company, Seoul (KR); Kia Corporation, Seoul (KR)

(72) Inventor: Hang Chul Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/360,246

(22) Filed: Jun. 28, 2021

(30) Foreign Application Priority Data

Dec. 16, 2020 (KR) .......... 10-2020-0176216

(51) Int. Cl.
*B60K 6/547* (2007.10)
*B60K 6/365* (2007.10)
*F16H 37/06* (2006.01)

(52) U.S. Cl.
CPC .......... *B60K 6/547* (2013.01); *B60K 6/365* (2013.01); *F16H 37/065* (2013.01); *B60Y 2200/92* (2013.01); *B60Y 2400/70* (2013.01); *F16H 2200/0078* (2013.01); *F16H 2200/2005* (2013.01); *F16H 2200/2038* (2013.01)

(58) Field of Classification Search
CPC ....... B60K 6/547; B60K 6/365; F16H 37/065; F16H 2200/0078; F16H 2200/2005; F16H 2200/2038; B60Y 2200/92; B60Y 2400/70
See application file for complete search history.

(56) References Cited

U.S. PATENT DOCUMENTS

| | | | | |
|---|---|---|---|---|
| 8,075,436 B2* | 12/2011 | Bachmann | ............ | B60W 10/06 477/3 |
| 8,684,875 B2* | 4/2014 | Kaltenbach | ............ | B60K 6/48 475/5 |
| 8,790,202 B2* | 7/2014 | Sakai | ............ | B60K 6/365 475/5 |
| 9,194,483 B2* | 11/2015 | Igarashi | ............ | F16H 57/0436 |
| 10,071,622 B2* | 9/2018 | Kaltenbach | ............ | B60W 10/115 |
| 10,246,081 B2* | 4/2019 | Toyama | ............ | B60W 10/113 |

* cited by examiner

*Primary Examiner* — Tinh Dang
(74) *Attorney, Agent, or Firm* — Morgan, Lewis & Bockius LLP

(57) ABSTRACT

A power transmission apparatus of a hybrid vehicle using an engine and a motor-generator as a power source, includes a first shaft fixedly connected to an output side of the engine, a second shaft selectively connectable to the first shaft and fixedly connected to the motor-generator, a third shaft selectively connectable to the second shaft, a fourth shaft disposed without rotational interference in the external circumference of the third shaft, a fifth shaft externally geared with the third and fourth, a sixth shaft externally geared with the fourth shaft, a planetary gear set including first, second, and third rotation elements, and one of the three rotation elements is fixedly connected to the second shaft, the other rotation element is selectively connectable to a transmission housing, and the other rotation element is fixedly connected to the fourth, and four gear trains forming an external gear connection between the first, second, third, fourth, fifth and sixth shafts.

15 Claims, 2 Drawing Sheets

FIG. 2

| Mode | Shift stage | CL1 | CL2 | BK | SM1 | SM2 | SM3 | |
|---|---|---|---|---|---|---|---|---|
| Engine mode & HEV mode | 1 stage | ● | | ● | ●(↑) | ●(↑) | | |
| | 2 stage | ● | ● | | ●(↑) | | | |
| | 3 stage | ● | ● | | | ●(↓) | | |
| | 4 stage | ● | | ● | ●(↓) | | | |
| | 5 stage | ● | | ● | | | ●(↑) | |
| | 6 stage | ● | ● | | | | ●(↑) | |
| | Reverse | | | | ●(↑) | ●(↑) | | MG reverse rotation |
| EV mode | 1 stage | | ● | | ●(↑) | ●(↑) | | |
| | 2 stage | | ● | | ●(↑) | ●(↑) | | |
| | 3 stage | | ● | | ●(↓) | | | |
| | 4 stage | | | ● | | ●(↓) | | |
| | 5 stage | | | ● | | | ●(↑) | |
| | 6 stage | | | ● | ●(↑) | ●(↑) | ●(↑) | |
| | Reverse | | | | ●(↑) | ●(↑) | | MG reverse rotation |

POWER TRANSMISSION APPARATUS OF HYBRID VEHICLE

CROSS-REFERENCE TO RELATED APPLICATION

The present application claims priority to Korean Patent Application No. 10-2020-0176216 filed on Dec. 16, 2020, the entire contents of which is incorporated herein for all purposes by this reference.

BACKGROUND OF THE INVENTION

Field of the Invention

The present invention relates to a power transmission apparatus for a hybrid vehicle. More particularly, the present invention relates to a power transmission apparatus for a hybrid vehicle which may reduce cost and improve fuel efficiency with a simple configuration.

Description of Related Art

Vehicle environment-friendly technology is a key technology for the survival of the vehicle industry in the future, and advanced vehicle makers are focusing on developing environment-friendly vehicles to cope with environmental and fuel efficiency regulations.

Accordingly, vehicle makers are developing electric vehicles (EV: Electric Vehicle), hybrid electric vehicles (HEV: Hybrid Electric Vehicle), and fuel cell vehicles (FCEV: Fuel Cell Electric Vehicle) as future vehicle technologies.

Since the above-described future vehicle has various technical limitations such as weight and cost, vehicle makers are paying attention to hybrid vehicles as an alternative to practical problems for satisfying exhaust gas regulations and improving fuel efficiency performance, and putting them into practice.

A hybrid vehicle is a vehicle that utilizes two or more power sources (power sources), and may be combined in various ways. As a power source, a gasoline engine or diesel engine that utilizes conventional fossil fuel and is driven by electrical energy. A motor-generator is used in combination.

According to the combination of engine and motor-generator, the present hybrid vehicle may implement EV mode driven only by motor-generator, HEV mode by simultaneous driving of engine and motor-generator, and engine mode driven only by engine.

The information included in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a hybrid vehicle which may reduce cost and improve fuel efficiency with a simple configuration.

A power transmission apparatus of a hybrid vehicle using an engine and a motor-generator as a power source the power transmission apparatus according to various exemplary embodiments of the present invention may include a first shaft fixedly connected to an output side of the engine, a second shaft selectively connectable to the first shaft and fixedly connected to the motor-generator, a third shaft disposed on the same axis as the first shaft and selectively connectable to the second shaft, a fourth shaft formed as a hollow shaft and disposed without rotational interference in the external circumference of the third shaft, a fifth shaft which is disposed in parallel with the shafts and is externally geared with the third and fourth shafts to output torque transmitted from the third and fourth shafts. A sixth shaft disposed in parallel with the shafts and externally geared with the fourth shaft to output torque transmitted from the fourth shaft, a planetary gear set including first, second, and third rotation elements, and one of the three rotation elements is fixedly connected to the second shaft, the other rotation element is selectively connectable to a transmission housing, and the other rotation element is fixedly connected to the fourth, and four gear trains forming an external gear connection between the first, second, third, fourth, fifth and sixth shafts.

The planetary gear set may be a single pinion planetary gear set, and the first, second, and third rotation elements are sun gear, planet carrier, and ring gears.

The first rotation element may be selectively connectable to the transmission housing, the second rotation element may be fixedly connected to the fourth shaft, and the third rotation element may be fixedly connected to the second shaft.

The power transmission apparatus may further include two clutches selectively connecting any one of the shafts to the other shaft, and a brake selectively connecting one rotation element of the first, second and third rotation elements and the transmission housing.

The two clutches may include a first clutch provided between the first shaft and the second shaft, and a second clutch provided between the second shaft and the third shaft, and the brake may be provided between the first rotation element of the planetary gear set and the transmission housing.

The four gear trains may include a first gear train including a first drive gear fixed to the third shaft, and a first driven gear disposed without rotational interference in the external circumference of the fifth shaft and externally gear-engaged with the first drive gear, a second gear train including a second drive gear fixed to the third shaft, and a second driven gear disposed without rotational interference in the external circumference of the fifth shaft and externally gear-engaged with the second drive gear, a third gear train including a third drive gear disposed without rotational interference in the external circumference of the fourth shaft, and a third driven gear fixedly disposed on the fifth shaft and externally gear-engaged with the third drive gear, and a fourth gear train including a fourth drive gear fixed to the fourth shaft, and a fourth driven gear disposed without rotational interference in the external circumference of the sixth shaft and externally gear-engaged with the fourth drive gear.

The power transmission apparatus may further include three synchromesh selectively synchronously connecting the first, second, fourth driven gear and second and third drive gear to the fourth and fifth shafts. The three synchromesh may include a first synchromesh configured to selectively synchronously connect the first and second driven gears to the fifth shaft, a second synchromesh configured to selectively synchronously connect the third drive gear and the fourth shaft, or selectively synchronously connect the third and fourth shafts, and a third synchromesh configured to selectively synchronously connect the fourth driven gear and the sixth shaft.

A power transmission apparatus of a hybrid vehicle using an engine and a motor-generator as a power source, the power transmission apparatus according to various exemplary embodiments of the present invention may include a first shaft fixedly connected to an output side of the engine, a second shaft selectively connectable to the first shaft and fixedly connected to the motor-generator, a third shaft disposed on the same axis as the first shaft and selectively connectable to the second shaft, a fourth shaft formed as a hollow shaft and disposed without rotational interference in the external circumference of the third shaft, a fifth shaft which is disposed in parallel with the shafts and is externally geared with the third and fourth shafts to output torque transmitted from the third and fourth shafts, a sixth shaft disposed in parallel with the shafts and externally geared with the fourth shaft to output torque transmitted from the fourth shaft, a planetary gear set including first, second, and third rotation elements, and one of the three rotation elements is fixedly connected to the second shaft, the other rotation element is selectively connectable to a transmission housing, and the other rotation element is fixedly connected to the fourth, three friction elements connecting any one of the shafts to the other shaft, and selectively connecting the rotation element of the planetary gear set and the transmission housing, and four gear trains forming an external gear connection between the first, second, third, fourth, fifth and sixth shafts.

The planetary gear set may be a single pinion planetary gear set, and the first, second, and third rotation elements are sun gear, planet carrier, and ring gears.

The first rotation element may be selectively connectable to the transmission housing, the second rotation element may be fixedly connected to the fourth shaft, and the third rotation element may be fixedly connected to the second shaft.

The friction element may include a first clutch provided between the first shaft and the second shaft, a second clutch provided between the second shaft and the third shaft, and a brake provided between the first rotation element of the planetary gear set and the transmission housing.

The four gear trains may include a first gear train including a first drive gear fixed to the third shaft, and a first driven gear disposed without rotational interference in the external circumference of the fifth shaft and externally gear-engaged with the first drive gear, a second gear train including a second drive gear fixed to the third shaft, and a second driven gear disposed without rotational interference in the external circumference of the fifth shaft and externally gear-engaged with the second drive gear, a third gear train including a third drive gear disposed without rotational interference in the external circumference of the fourth shaft, and a third driven gear fixedly disposed on the fifth shaft and externally gear-engaged with the third drive gear, and a fourth gear train including a fourth drive gear fixed to the fourth shaft, and a fourth driven gear disposed without rotational interference in the external circumference of the sixth shaft and externally gear-engaged with the fourth drive gear.

The power transmission apparatus may further include three synchromesh selectively synchronously connecting the first, second, fourth driven gear and second and third drive gear to the fourth and fifth shafts. The three synchromesh may include a first synchromesh configured to selectively synchronously connect the first and second driven gears to the fifth shaft, a second synchromesh configured to selectively synchronously connect the third drive gear and the fourth shaft, or selectively synchronously connect the third and fourth shafts, and a third synchromesh configured to selectively synchronously connect the fourth driven gear and the sixth shaft.

The power transmission apparatus of a hybrid vehicle according to various exemplary embodiments of the present invention may realize 6 forward speed stages and one reverse speed stage with one motor-generator, one planetary gear set, three friction elements, eight external gears, and three synchromesh.

Furthermore, the power transmission apparatus of a hybrid vehicle according to various exemplary embodiments of the present invention may reduce production cost by a simple configuration and improve fuel efficiency by reducing weight.

Furthermore, the effect obtained or predicted by various exemplary embodiments of the present invention will be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart for each operation mode of a friction element applied to a power transmission apparatus of a hybrid vehicle according to various exemplary embodiments of the present invention.

Figure 1:
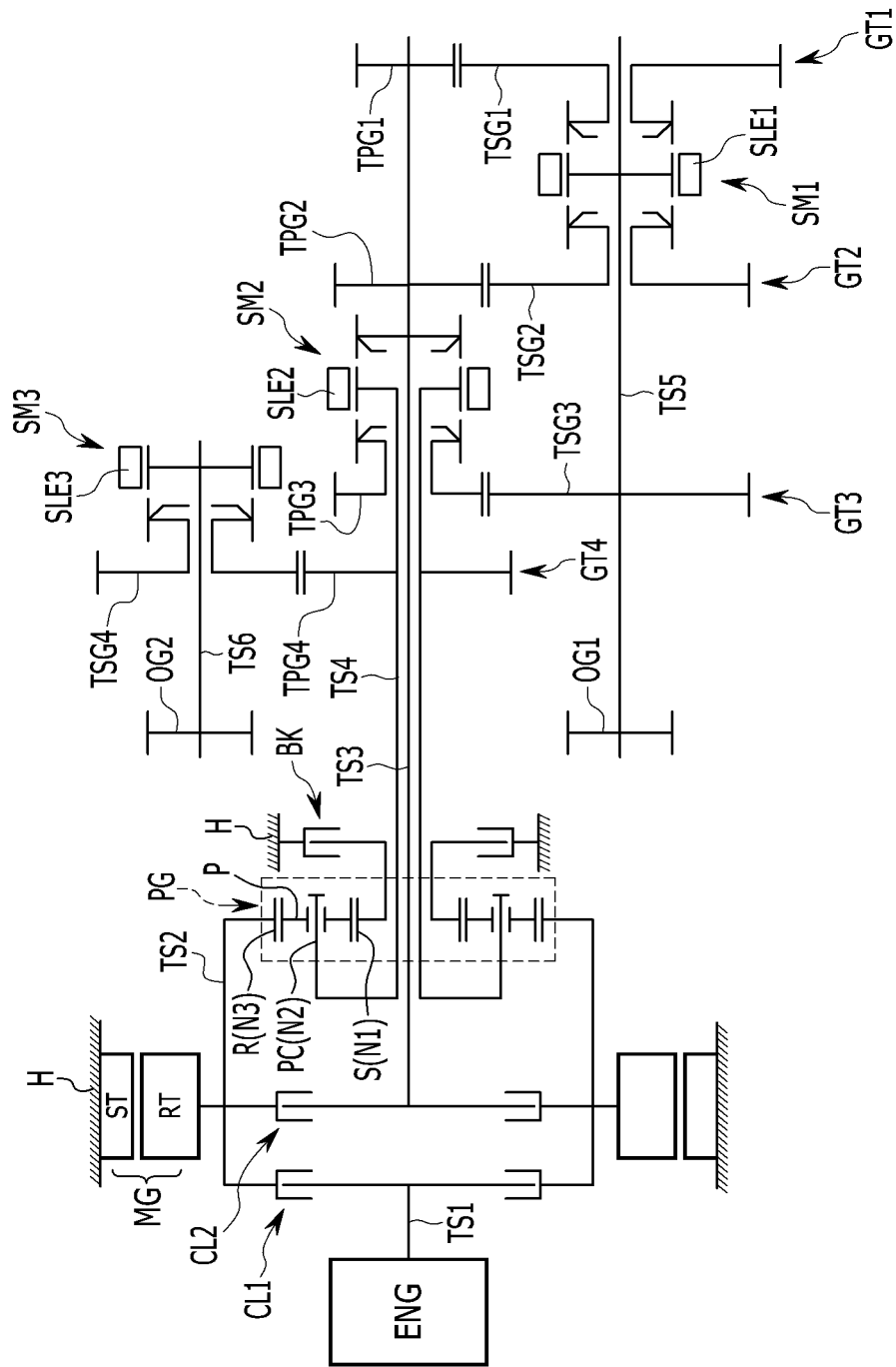
FIG. 1 is a schematic diagram of a power transmission apparatus of a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly describe the present invention, parts irrelevant to the description have been omitted, and the same or similar components will be described with the same reference numerals throughout the specification.

Since the size and thickness of each component shown in the drawings are arbitrarily shown for convenience of description, the present invention is not necessarily limited to those shown in the drawings, and the thickness is enlarged to clearly express various parts and regions.

Furthermore, in the following description, the names of the components are divided into first, second, etc. To distinguish them because the names of the components are the same, and are not necessarily limited to the order in the following description.

When a part of the specification is said to "include" a certain element, it means that other elements may be further included, rather than excluding other elements, unless specifically stated to the contrary.

Furthermore, terms such as ". . . unit", ". . . means", ". . . part" and ". . . member" described in the specification refer to a unit of a comprehensive constitution that performs at least one function or operation.

FIG. 1 is a schematic diagram of a power transmission apparatus of a hybrid vehicle according to various exemplary embodiments of the present invention.

Referring to FIG. 1, a power transmission apparatus of a hybrid vehicle according to various exemplary embodiments of the present invention utilizes engine ENG and a motor-generator MG as power sources, includes six shaft TS1-TS6, one planetary gear set PG, three friction elements CL1, CL2 and BK, four gear trains GT1, GT2, GT3 and GT4, three synchromesh SM1, SM2, and SM3, and is configured to change torque of the engine ENG and the motor-generator MG to transmit to a differential.

The engine ENG is a primary power source, and various known engines such as gasoline engines or diesel engines using conventional fossil fuels may be used.

The motor-generator MG is an auxiliary power source and performs motor and generator functions as known, including a stator ST fixed to transmission housing H, and a rotor RT rotatably supported inside the radial direction of the stator ST.

The planetary gear set PG is a single pinion planetary gear set, includes a sun gear S as a first rotation element N1, a planet carrier PC as a second rotation element N2 a plurality of pinion gear P gear-engaged with the sun gear S to rotate and revolve, and a ring gear R as a third rotation element N3 which is internally engaged with the plurality of pinion gear P and is powered to the sun gear S.

The engine ENG, the motor-generator MG, and the planetary gear set PG are connected to each other to enable power delivery through the six shafts TS1-TS6.

A detailed description at the configuration of the six shafts TS1-TS6 is as follows.

The first shaft TS1 may mean an input shaft which is fixedly connected to the output side (crankshaft) of the engine ENG and transmits the torque generated from the engine ENG to the transmission.

The second shaft TS2 is fixedly connected to the rotor RT of the motor-generator MG disposed with the first shaft TS1 as the rotation center, and is selectively connectable to the first shaft TS1 so that it is always linked to the motor-generator MG and selectively receives torque of the first shaft TS1.

Furthermore, the rear end portion of the second shaft TS2 is fixedly connected to the third rotation element N3 of the planetary gear set PG, so that the torque of the second shaft TS2 may be transmitted to the planetary gear set PG.

The third shaft TS3 is disposed coaxially on the rear side of the first shaft TS1, and is selectively connectable to the second shaft TS2 to selectively transmit the torque of the second shaft TS2.

The fourth shaft TS4 is a hollow shaft, disposed without rotational interference in the external circumference of the third shaft TS3, and the front end portion thereof is fixedly connected to the second rotation element N2 of the planetary gear set PG.

Accordingly, the fourth shaft TS4 can receive torque from the engine ENG and motor-generator MG, which have been converted to torque by the planetary gear set PG.

The fifth shaft TS5 is a first output shaft, disposed in parallel with the shafts TS1-TS4, and a first output gear OG1 is fixedly disposed at one end portion.

The sixth shaft TS6 is a second output shaft, and is disposed in parallel with the shafts TS1-TS4, and a second output gear OG2 is fixedly disposed at one end portion.

In the above, the first output gear OG1 of the fifth shaft TS5 and the second output gear OG2 of the sixth shaft TS6 are externally geared with a differential final reduction gear to transmit the torque transmitted to the fifth, sixth shaft TS5, and TS6 to the differential.

Among the three rotation elements N1, N2, and N3 of the planetary gear set PG, the first rotation element N1 may be selectively connectable to the transmission housing H, and the torque input to the third rotation element N3 is decelerated and then the decelerated torque outputs through the second rotation element N2.

The third and fourth shafts TS3, and TS4 are externally geared to each other by first, second, third and fourth gear trains GT1, GT2, GT3, and GT4 to transmit torque to the fifth and sixth shafts TS5, and TS6

The first gear train GT1 includes a first drive gear TPG1 fixedly disposed on the third shaft TS3, and a first driven gear TSG1 disposed on the external circumferential side of the fifth shaft TS5 without rotational interference and externally gear-engaged with the first drive gear TPG1.

The second gear train GT2 includes a second drive gear TPG2 fixed to the third shaft TS3, and a second driven gear TSG2 disposed without rotational interference in the external circumference of the fifth shaft TS5 and externally gear-engaged with the second drive gear TPG2.

The third gear train GT3 includes a third drive gear TPG3 disposed without rotational interference in the external circumference of the fourth shaft TS4, and a third driven gear TSG3 fixedly disposed on the fifth shaft TS4 and externally gear-engaged with the third drive gear TPG3.

The fourth gear train GT4 includes a fourth drive gear TPG4 fixed to the fourth shaft TS4, and a fourth driven gear TSG4 disposed without rotational interference in the external circumference of the sixth shaft TS6 and externally gear-engaged with the fourth drive gear TPG4.

The first, second, and fourth driven gear TSG1, TSG2, and TSG4 and the second, and third drive gear TPG2, and TPG3 are configured to be selectively synchronously connected to the fourth, fifth, and sixth shafts TS4, TS5, and TS6 by first, second, and third synchromesh SM1, SM2, and SM3.

That is, the first synchromesh SM1 is configured to selectively synchronously connect the first driven gear TSG1 and the second driven gear TSG2 to the fifth shaft TS5.

Furthermore, the second synchromesh SM2 is configured to selectively synchronously connect third drive gear TPG3 and fourth shaft TS4, and selectively connect third shaft TS3 and fourth shaft TS4 at the same time.

Furthermore, the third synchromesh SM3 can selectively synchronously connect the fourth driven gear TSG4 and the sixth shaft TS6.

In the above, the gear ratio of each of the first, second, third, and fourth drive gears TPG1, TPG2, TPG3, and TPG4, and the first, second, third, and fourth driven gears TSG1, TS2, TS3, and TPG4 depends on the design condition of the transmission.

As an example, in the power transmission apparatus according to various exemplary embodiments of the present invention, the first gear train GT1 may be set as the gear ratio of first and second shift-stage, the second gear train GT2 may be set as the gear ratio of fourth shift-stage, the third gear train GT3 may be set as the gear ratio of third shift-stage, and the fourth gear train GT4 may be set as the gear ratio of fifth and sixth shift-stage. But this is various exemplary embodiments of the present invention, but is not limited thereto.

Since the above first, second, and third synchromesh SM1, SM2, and SM3 are known configurations, detailed description is omitted, and the first, second, and third sleeve SLE1, SLE2 and SLE3 applied to the first, second, and third synchromesh SM1, SM2, and SM3 may be provided with separate non-illustrated actuators, and are configured to control the actuators when shifting by the transmission control unit.

Furthermore, in various exemplary embodiments of the present invention, two clutches CL1, CL2, and one brake BK, which are friction elements, are disposed at the portion where the shaft and shaft, rotation element and transmission housing H are selectively connectable to each other.

Positions of the two clutches CL1, and CL2 and one brake BK are referred to as follows.

The first clutch CL1 is an engine clutch, disposed between the first shaft TS1 and the first shaft TS2, and selectively connects the first shaft TS1 and the second shaft TS2, controlling power delivery therebetween.

The second clutch CL2 is disposed between the second shaft TS2 and the third shaft TS3, and selectively connects the second shaft TS2 and the third shaft TS3, controlling power delivery therebetween.

The brake BK is disposed between the first rotation element N1 of the planetary gear set PG and the transmission housing H, and allows the first rotation element N1 of the planetary gear set PG to be selectively fixed.

In the above, each friction element including the first, second clutches CL1, and CL2 and brake BK may be a multi-plate hydraulic pressure friction device operated by hydraulic pressure supplied from a hydraulic pressure control apparatus. The friction element is mainly a wet multiplate type hydraulic pressure friction coupling unit, but may be a coupling unit which may be operated according to the electrical signal supplied from the electronic control apparatus, such as a dog clutch, an electronic clutch, or a magnetic powder clutch.

In the above description, the term fixedly connected or similar means that the rotation element connected to the shaft and the shaft are connected to each other to rotate without a difference in rotation speed.

That is, the fixedly connected rotation element and the corresponding shaft rotate in the same rotation direction and rotation speed.

Furthermore, in the above description, the term selectively connectable or similar means that the corresponding shaft is connected to rotatable in the same rotation direction and rotation speed through an engagement element (clutch or synchromesh, etc.).

That is, when the engagement element is selectively connectable to the shaft and the rotation element, when the engagement element is operated, the shaft and the rotation element are rotated at the same rotation direction and rotation speed, and when the engagement element is released, the connection of the shaft is released.

FIG. 2 is an operation chart for each operation mode of a friction element applied to a power transmission apparatus of a hybrid vehicle according to various exemplary embodiments of the present invention.

[Engine and Hybrid (HEV) Mode 1st Stage]

In engine mode or hybrid (HEV) mode 1st stage, the first clutch CL1 and the brake BK are operated, the first driven gear TSG1 and the fifth shaft TS5 are synchronously connected by the first synchromesh SM1, and the second drive gear TPG2 and the third shaft TS3 are synchronously connected by the second synchromesh SM2.

Accordingly, in the engine mode, torque of engine ENG is transmitted to second shaft TS2, and in the hybrid (HEV) mode, torque of the engine ENG and the motor-generator MG is transmitted to second shaft TS2.

Accordingly, the torque of the second shaft TS2 is decelerated in the planetary gear set PG and transmitted to the fourth shaft TS4, and the torque transmitted to the fourth shaft TS4 is transmitted to the third shaft TS3 through the second synchromesh SM2, and the torque transmitted to the third shaft TS3 is transmitted to the fifth shaft TS5 through the first gear train GT1 and the first synchromesh SM1, and then output through the differential through the first output gear OG1 to drive the first stage forward.

In other words, the shift in the 1st forward stage is made by the gear ratio of the first gear train GT1 after being decelerated in the planetary gear set PG.

[Engine and Hybrid (HEV) Mode 2nd Stage]

In engine mode or hybrid (HEV) mode 2nd stage, the first clutch and second clutch CL1 and CL2 are operated, and the first driven gear TSG1 and the fifth shaft TS5 are synchronously connected by the first synchromesh SM1.

Accordingly, in the engine mode, torque of engine ENG is transmitted to second shaft TS2, and in the hybrid (HEV) mode, torque of the engine ENG and the motor-generator MG is transmitted to second shaft TS2.

Accordingly, the torque of the second shaft TS2 is transmitted to the third shaft TS3 by the operation of the second clutch CL2, and the torque transmitted to the third shaft TS3 is transmitted to the fifth shaft TS5 through the first gear train GT1 and the first synchromesh SM1, and then output through the differential through the first output gear OG1 to drive the 2nd stage forward.

In other words, the shift in the 2nd forward stage is made by the gear ratio of the first gear train GT1.

[Engine and Hybrid (HEV) Mode 3rd Stage]

In engine mode or hybrid (HEV) mode 3rd stage, the first clutch CL1 and brake BK are operated, and the third drive gear TPG3 and the fourth shaft TS4 are synchronously connected by the second synchromesh SM2.

Accordingly, in the engine mode, torque of engine ENG is transmitted to second shaft TS2, and in the hybrid (HEV)

mode, torque of the engine ENG and the motor-generator MG is transmitted to second shaft TS2.

Accordingly, the torque of the second shaft TS2 is decelerated in the planetary gear set PG and transmitted to the fourth shaft TS4, and the torque transmitted to the fourth shaft TS4 is transmitted to the fifth shaft TS5 through the second synchromesh SM2 and the third gear train GT3, and then the first output. It is output as a differential through the gear OG1, and then output through the differential through the first output gear OG1 to drive the 3rd stage forward.

In other words, the shift of the forward 3rd stage is made by the gear ratio of the third gear train GT3 after being decelerated in the planetary gear set PG.

[Engine and Hybrid (HEV) Mode 4th Stage]

In engine mode or hybrid (HEV) mode 4th stage, the first clutch and second clutch CL1 and CL2 are operated, and the second driven gear TSG2 and the fifth shaft TS5 are synchronously connected by the first synchromesh SM1.

Accordingly, in the engine mode, torque of engine ENG is transmitted to second shaft TS2, and in the hybrid (HEV) mode, torque of the engine ENG and the motor-generator MG is transmitted to second shaft TS2.

Accordingly, the torque of the second shaft TS2 is transmitted to the third shaft TS3 by the operation of the second clutch CL2, and the torque transmitted to the third shaft TS3 is transmitted to the fifth shaft TS5 through the second gear train GT2 and the first synchromesh SM1, and then output through the differential through the first output gear OG1 to drive the 4th stage forward.

In other words, the shift in the 4th forward stage is achieved by the gear ratio of the second gear train GT2.

[Engine and Hybrid (HEV) Mode 5th Stage]

In engine mode or hybrid (HEV) mode 5th stage, the first clutch CL1 and the brake BK are operated, and the fourth driven gear TSG4 and the sixth shaft TS6 are synchronously connected by the third synchromesh SM3.

Accordingly, in the engine mode, torque of engine ENG is transmitted to second shaft TS2, and in the hybrid (HEV) mode, torque of the engine ENG and the motor-generator MG is transmitted to second shaft TS2.

Accordingly, the torque of the second shaft TS2 is decelerated in the planetary gear set PG and transmitted to the fourth shaft TS4, and the torque transmitted to the fourth shaft TS4 is transmitted to the sixth shaft TS6 through the fourth gear train GT4 and third synchromesh SM3, and then output through the differential through the second output gear OG2 to drive the 5th stage forward.

In other words, the shift in the 5th forward stage is made by the gear ratio of the fourth gear train GT4 after being decelerated in the planetary gear set PG.

[Engine and Hybrid (HEV) Mode 6th Stage]

In engine mode or hybrid (HEV) mode 6th stage, the first clutch and the second clutch CL1 and CL2 are operated, the second drive gear TPG2 and the third shaft TS3 are synchronously connected by the second synchromesh SM2, and the fourth driven gear TSG4 and the sixth shaft TS6 are synchronously connected by third synchromesh SM3.

Accordingly, in the engine mode, torque of engine ENG is transmitted to second shaft TS2, and in the hybrid (HEV) mode, torque of the engine ENG and the motor-generator MG is transmitted to second shaft TS2.

Accordingly, the torque of the second shaft TS2 is transmitted to the third shaft TS3 by the operation of the second clutch CL2, and the torque transmitted to the third shaft TS3 is transmitted to the fourth shaft TS4 through the second synchromesh SM2, and the torque transmitted to the fourth shaft TS4 is transferred to the sixth shaft TS6 through the fourth gear train GT4 and the third synchromesh SM3, and then output through the differential through the second output gear OG2 to drive the 6th stage forward.

In other words, the shift in the 6th forward stage is achieved by the gear ratio of the fourth gear train GT4.

[Engine and Hybrid (HEV) Mode Reverse Stage]

In engine mode or hybrid (HEV) mode reverse speed, the brake BK is operated, the first driven gear TSG1 and the fifth shaft TS5 are synchronously connected by the first synchromesh SM1, and the second drive gear TPG2 and the third shaft TS3 are synchronously connected by the second synchromesh SM2.

And the reverse stage in engine mode or hybrid (HEV) mode may be driven only with the reverse rotation torque of the motor-generator MG, and only the reverse rotation torque of the motor-generator MG is transmitted to the second shaft TS2.

Accordingly, the torque of the second shaft TS2 is decelerated in the planetary gear set PG and transmitted to the fourth shaft TS4, and the torque transmitted to the fourth shaft TS4 is transmitted to the third shaft TS3 through the second synchromesh SM2, and the torque transmitted to the third shaft TS3 is transmitted to fifth shaft TS5 through the first gear train GT1 and the first synchromesh SM1, and then output through the differential through the first output gear OG1 to perform reverse stage driving.

That is, shifting to the reverse speed is achieved by the gear ratio of the first gear train GT1 after the reverse rotation torque of the motor-generator MG is decelerated in the planetary gear set PG.

Furthermore, in the electric vehicle mode (EV), driving is performed only with the rotational power of the motor-generator MG without the rotational power of the engine ENG. The shifting process is the same as that of the engine and hybrid mode, but the engine ENG is not driven and the first clutch CL1 does not operate, so that the detailed description is omitted.

As described above, the power transmission apparatus of a hybrid vehicle according to various exemplary embodiments of the present invention includes one motor-generator, one planetary gear set, three friction elements, eight external gears and three synchromesh to realize the forward 6th stages and one reverse stage.

Furthermore, the power transmission apparatus of a hybrid vehicle according to various exemplary embodiments of the present invention can reduce production cost by a simple configuration and improve fuel efficiency by reducing weight.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle using an engine and a motor-generator as a power source, the power transmission apparatus comprising:
    a first shaft fixedly connected to the engine;
    a second shaft selectively connectable to the first shaft and fixedly connected to the motor-generator;
    a third shaft mounted on a same axis as the first shaft and selectively connectable to the second shaft;
    a fourth shaft formed as a hollow shaft and mounted without rotational interference with the third shaft in an external circumference of the third shaft;
    a fifth shaft which is mounted in parallel with one of the first, second, third and fourth shafts and is gear-engaged with the third shaft and the fourth shaft to output torque transmitted from the third shaft and the fourth shaft;
    a sixth shaft mounted in parallel with one of the first, second, third, fourth and fifth shafts and gear-engaged with the fourth shaft to output torque transmitted from the fourth shaft;
    a planetary gear set including a first rotation element, a second rotation element, and a third rotation element, and one rotation element among the first rotation element, the second rotation element and the third rotation elements is fixedly connected to the second shaft, the other rotation element among the first rotation element, the second rotation element and the third rotation elements is selectively connectable to a transmission housing, and another rotation element among the first rotation element, the second rotation element and the third rotation elements is fixedly connected to the fourth shaft; and
    four gear trains forming an external gear connection between the first, second, third, fourth, fifth and sixth shafts.

2. The power transmission apparatus of claim 1,
    wherein the planetary gear set is a single pinion planetary gear set, and
    wherein the one rotation element among the first rotation element, the second rotation element and the third rotation elements is the third rotation element, the other rotation element among the first rotation element, the second rotation element and the third rotation elements is the first rotation element, and the another rotation element among the first rotation element, the second rotation element and the third rotation elements is the second rotation element.

3. The power transmission apparatus of claim 2, wherein the first rotation element, the second rotation element and the third rotation element are a sun gear, a planet carrier, and a ring gear, respectively.

4. The power transmission apparatus of claim 2,
    wherein the first rotation element is selectively connectable to the transmission housing by a brake;
    wherein the second rotation element is fixedly connected to the fourth shaft; and
    wherein the third rotation element is fixedly connected to the second shaft.

5. The power transmission apparatus of claim 1, further including two clutches selectively connecting one shaft of the first, second, third, fourth, fifth and sixth shafts to another shaft of the first, second, third, fourth, fifth and sixth shafts, and a brake selectively connecting the other rotation element of the first, second and third rotation elements and the transmission housing.

6. The power transmission apparatus of claim 5, wherein the two clutches include:
    a first clutch mounted between the first shaft and the second shaft; and
    a second clutch mounted between the second shaft and the third shaft,
    wherein the other rotation element among the first rotation element, the second rotation element and the third rotation elements is the first rotation element, and
    wherein the brake is mounted between the first rotation element of the planetary gear set and the transmission housing.

7. The power transmission apparatus of claim 1, wherein the four gear trains include:
    a first gear train including a first drive gear fixed to the third shaft, and a first driven gear mounted without rotational interference with the fifth shaft in an external circumference of the fifth shaft and gear-engaged with the first drive gear;
    a second gear train including a second drive gear fixed to the third shaft, and a second driven gear mounted without rotational interference with the fifth shaft in an external circumference of the fifth shaft and gear-engaged with the second drive gear;
    a third gear train including a third drive gear mounted without rotational interference with the fourth shaft in an external circumference of the fourth shaft, and a third driven gear fixedly mounted on the fifth shaft and gear-engaged with the third drive gear; and
    a fourth gear train including a fourth drive gear fixed to the fourth shaft, and a fourth driven gear mounted without rotational interference with the sixth shaft in an external circumference of the sixth shaft and gear-engaged with the fourth drive gear.

8. The power transmission apparatus of claim 7, further including:
    three synchromesh selectively connecting the first, second, and fourth driven gears and second and third drive gears to the fourth, fifth and sixth shafts,
    wherein the three synchromesh including:
        a first synchromesh configured to selectively connect one of the first and second driven gears to the fifth shaft;
        a second synchromesh configured to selectively connect the third drive gear and the fourth shaft, or selectively connect the third shaft and the fourth shaft; and
        a third synchromesh configured to selectively connect the fourth driven gear and the sixth shaft.

9. A power transmission for a vehicle using an engine and a motor-generator as a power source, the power transmission apparatus comprising:
- a first shaft fixedly connected to the engine;
- a second shaft selectively connectable to the first shaft and fixedly connected to the motor-generator;
- a third shaft mounted on a same axis as the first shaft and selectively connectable to the second shaft;
- a fourth shaft formed as a hollow shaft and mounted without rotational interference with the third shaft in an external circumference of the third shaft;
- a fifth shaft which is mounted in parallel with one of the first, second, third and fourth shafts and is gear-engaged with the third shaft and the fourth shaft to output torque transmitted from the third shaft and the fourth shaft;
- a sixth shaft mounted in parallel with one of the first, second, third, fourth and fifth shafts and gear-engaged with the fourth shaft to output torque transmitted from the fourth shaft;
- a planetary gear set including a first rotation element, a second rotation element, and a third rotation element, and one rotation element among the first rotation element, the second rotation element, and the third rotation element is fixedly connected to the second shaft, the other rotation element among the first rotation element, the second rotation element, and the third rotation element is selectively connectable to a transmission housing, and another rotation element among the first rotation element, the second rotation element, and the third rotation element is fixedly connected to the fourth shaft;
- three friction elements connecting one shaft of the first, second, third, fourth, fifth and sixth shafts to another shaft of the first, second, third, fourth, fifth and sixth shafts, and selectively connecting the other rotation element of the first, second and third rotation elements and the transmission housing; and
- four gear trains forming an external gear connection between the first, second, third, fourth, fifth and sixth shafts.

10. The power transmission apparatus of claim 9,
wherein the planetary gear set is a single pinion planetary gear set, and
wherein the one rotation element among the first rotation element, the second rotation element and the third rotation elements is the third rotation element, the other rotation element among the first rotation element, the second rotation element and the third rotation elements is the first rotation element, and the another rotation element among the first rotation element, the second rotation element and the third rotation elements is the second rotation element.

11. The power transmission apparatus of claim 10, wherein the first rotation element, the second rotation element and the third rotation element are a sun gear, a planet carrier, and a ring gear, respectively.

12. The power transmission apparatus of claim 10, wherein
- the first rotation element is selectively connectable to the transmission housing by a brake;
- the second rotation element is fixedly connected to the fourth shaft; and
- the third rotation element is fixedly connected to the second shaft.

13. The power transmission apparatus of claim 9, wherein the three friction elements include:
- a first clutch mounted between the first shaft and the second shaft; and
- a second clutch mounted between the second shaft and the third shaft,
wherein the other rotation element among the first rotation element, the second rotation element and the third rotation elements is the first rotation element, and
a brake mounted between the first rotation element of the planetary gear set and the transmission housing.

14. The power transmission apparatus of claim 9, wherein the four gear trains include:
- a first gear train including a first drive gear fixed to the third shaft, and a first driven gear mounted without rotational interference with the fifth shaft in an external circumference of the fifth shaft and gear-engaged with the first drive gear;
- a second gear train including a second drive gear fixed to the third shaft, and a second driven gear mounted without rotational interference with the fifth shaft in an external circumference of the fifth shaft and gear-engaged with the second drive gear;
- a third gear train including a third drive gear mounted without rotational interference with the fourth shaft in an external circumference of the fourth shaft, and a third driven gear fixedly mounted on the fifth shaft and gear-engaged with the third drive gear; and
- a fourth gear train including a fourth drive gear fixed to the fourth shaft, and a fourth driven gear mounted without rotational interference with the sixth shaft in an external circumference of the sixth shaft and gear-engaged with the fourth drive gear.

15. The power transmission apparatus of claim 14, further including:
three synchromesh selectively connecting the first, second, and fourth driven gears and second and third drive gears to the fourth, fifth and sixth shafts,
wherein the three synchromesh including:
- a first synchromesh configured to selectively connect one of the first and second driven gears to the fifth shaft;
- a second synchromesh configured to selectively connect the third drive gear and the fourth shaft, or selectively connect the third shaft and the fourth shaft; and
- a third synchromesh configured to selectively connect the fourth driven gear and the sixth shaft.

* * * * *